United States Patent Office 3,309,336
Patented Mar. 14, 1967

3,309,336
VINYL FLOOR TILES AND COMPOSITIONS THEREFOR
Stanley P. Turel, Highland Park, N.J., assignor to Carlisle Chemical Works, Inc., Reading, Ohio
No Drawing. Filed Feb. 12, 1962, Ser. No. 172,764
5 Claims. (Cl. 260—41)

The invention relates to floor tile compositions containing as a major constituent a chlorine containing polymer and asbestos.

In the manufacture of such vinyl tiles, it has been found that the asbestos introduces discoloration due to a heat sensitivity which is independent of and additional to the normal heat and light sensitivity of chlorine containing polymers and, therefore, is not or very little influenced by the stabilizers conventionally used.

The discoloration produced in the heat treatment of asbestos containing chlorine containing polymer compositions in which the asbestos contains still at least part of the iron compounds naturally associated therewith, is quite unique. Upon milling, the compositions assume a light gray color but upon heating the color turns to a dark grayish purple which becomes deeper and deeper with subsequent heat treatment. Such discoloration is particularly obnoxious when floor tiles having light shades of color are desired. The theory has been advanced that iron oxide introduced as an impurity of the asbestos is responsible for the discoloration. There may be some doubt as to whether this explanation is entirely correct; however, there can be no doubt that it is the asbestos which is responsible for the difficulties experienced in making light colored asbestos fiber-vinyl binder compositions.

As stated above, the additives normally used for the heat stabilization of chlorine containing polymers fail when asbestos fibers are incorporated in the vinyl resin for the manufacture of floor tiles, thermal and acoustical insulations, and the like. In spite of extended research, so far no rule could be developed which would predict the stabilizing properties of chemical compounds on the resin-asbestos system, except the experience that compounds which have excellent heat-stabilizing properties on asbestos-free vinyl chloride polymers and copolymers, such as organotin compounds, fail when used in combination with asbestos. At present, some compounds which are not good stabilizers for fiber-free vinylchloride resins, such as urea, are available as protective agents against the discoloration of polyvinyl resin-asbestos compositions but are not yet quite satisfactory.

I have found a class of compounds which have a very pronounced specific protective effect against the discoloration of asbestos containing chlorine containing polymer compositions. These are compounds which contain the group $$X-\underset{\underset{H}{|}}{C}-N\underset{R^2}{\overset{R^1}{\diagup}}$$

wherein X is a member of the following groups

Cyanamide $$\equiv C-NH-$$

Guanidino

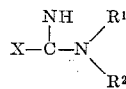

Hydrazino

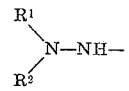

Amino $$R^1NH-$$

Amido

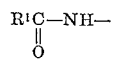

Alkylolamino

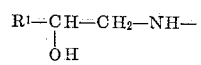

In these formulas, $R^1$ and $R^2$ are hydrogen or an unsubstituted or substituted hydrocarbon radical, for instance a lower alkyl having 1 to 8 carbon atoms, or an aryl group, for instance phenyl. One or more of the hydrogen atoms of the alkyl as well as the phenyl group may be substituted by groups which do not react with the other constituents of the composition. Such suitable substituents are, for instance, lower alkoxy, lower alkyl, halogen, nitro groups, and others.

Representative members of this class are guanidine and its $NR^1$ substituted derivatives, and salts thereof, such as alkyl and aryl biguanides, alkyl and amino guanidines, dicyandiamide, and the like. These compounds may be used alone or in mixture with each other or with other stabilizers. The amount required will depend, for instance, on the amount and purity of the asbestos, on the presence of other stabilizers, and other factors; it may vary from amounts less than 1 percent up to 10 percent and more by weight of the resin.

The compositions according to the invention contain generally about 10 to 50 percent by weight of asbestos fibers and about 5 to 20 percent by weight of the resin binder, which is a chlorine containing polymer or copolymer with an unsaturated polymerizable compound, such as vinyl acetate, vinylidene chloride, maleic anhydride, and others, wherein the ratio of vinyl chloride is not less than 60, preferably at least about 80 percent of the resin. In addition, the compositions may contain a major amount of a pigment, such as ground limestone, which increases the heat stability of the composition, fillers, and plasticizers. As plasticizers, I prefer to use those which have no or little lubricating properties such as alkyl benzoates but any conventional plasticizers such as dioctyl or didecyl phthalate and esters of dibasic acids like dioctyl azelate and sebacate, may also be used. Suitable amounts of plasticizers are about 20 to 100 parts for 100 parts of the resin component. The proportions are not critical and depend, like the chemical compositions of the filler and plasticizer, on the desired properties such as toughness, flexibility, impact strength, dimensional stability, abrasion resistance of the end product.

Though the novel stabilizers increase also to a certain extent the light stability of the vinyl floor tiles, it is of advantage to employ additional light stabilizers. Though any of the known light stabilizers may be used, I have found that certain organic and inorganic metal salts, in combination with the described heat stabilizers, will give a threefold increase in the light stability of the vinyl floor tile compositions. Such salts are, for example, alkali metal, alkaline earth metal, zinc, cadmium, lead, and tin salts of fatty acids, particularly those having 8 to 18 carbon atoms such as lauric acid, and of benzoic and substituted benzoic acids; suitable substituted benzoic acids are, for instance, those where one hydrogen atom is substituted by halogen or a lower alkyl group. Alkali metal salts of inorganic acids, for instance, the carbonates or sulfates, may also be used. It is of particular advantage to use mixtures of salts of different metals, particularly the Ba—Cd or Ba—Zn combinations. These salts are used in a total amount of about 0.05 to 5 percent by weight of the resin.

The following examples are given to illustrate the invention. All parts are given by weight unless specified otherwise.

The basic plastic composition used in all examples had the following formula:

| | Parts |
|---|---|
| Resin | 100 |
| Dioctyl phthalate (plasticizer) | 34 |
| Epoxidized soybean oil (plasticizer) | 3 |
| Ground limestone | 290 |
| Asbestos | 160 |
| Titanium dioxide pigment | 20 |

In composition I, the resin was a polyvinyl chloride-polyvinyl acetate copolymer (15% polyvinyl acetate), in composition II a polyvinyl chloride monomer.

The mixture was fused into a sheet by milling for 5 minutes at 240° F. The milled sheets were cut into pieces approximately 2 x 2 inches for heat and light stability testing.

For heat tests, the pieces were placed on a glass slide and baked in an air circulating oven at 300° F. Pieces were removed every 15 minutes. The original pieces representing the color of the films prepared from compositions I and II were after milling of a medium gray color. The pieces removed from the oven after 15 minutes baking time were dark purple in color, and the subsequent pieces removed from the oven became progressively darker.

For the light stability tests, appropraite strips of the sheeted compositions were mounted on an Atlas Fadeometer Test Mark No. SL 6 and placed in an Atlas Color Fadeometer, type FDA-R. After 15 hours, the surface of the strips of both compositions showed evidence of brown staining.

*Example 1*

5 parts of dicyandiamide were added to composition I, and the blend was milled as described above. The color of the sheet was a very light gray. On baking, no purple color was observed, and even after 2 hours the darkening of the gray color was very slight.

The same results were obtained when 5 parts of dicyandiamide were added to composition II.

*Example 2*

5 parts of phenyl biguanide were added to composition I. The color of the milled sheet was a light gray. Baking increased the gray color until purple coloration began to appear after 45 minutes baking time.

Almost the same result was obtained when the phenyl biguanide was replaced by p-chlorophenyl biguanide.

*Example 3*

5 parts of isopropyl biguanide were added to composition I, and the blend was treated in the same manner as set forth in the preceding examples.

The color of the milled sheet was of a light gray color, and subsequent baking increased the gray color only slightly until 30 minutes when a purple coloration began, and increased slightly up until 2 hours.

*Example 4*

Composition II was supplemented with 5 parts of ethyl guanidine hydrochloride. On baking, purple coloration appeared only after a baking time of 45 minutes.

Similar results were obtained when an equal amount of hydroxy ethyl guanidine hydrochloride was used instead of the ethyl guanidine hydrochloride.

*Example 5*

5 parts of amino guanidine bicarbonate were added to composition I. On baking pieces of the light grayish milled sheet, the original color was stabilized in its original hue for 1 hour.

*Example 6*

4 parts of dicyandiamide were added to composition I, and a sample of the milled sheet was tested in a Fadeometer as described above. The piece began to show evidence of brown staining only after 40 hours of exposure.

*Example 7*

To composition I, there were added 3.75 parts of dicyandiamide, 0.25 part of zinc dibenzoate and 0.075 part of barium bis(p-t-butyl benzoate). Treated as in the preceding example, test pieces showed evidence of brown staining only after 96 hours of exposure in the Fadeometer.

*Example 8*

Example 7 was repeated, with the further addition of 0.25 part of potassium carbonate. In this case, evidence of brown staining was observed only after 140 hours of exposure.

*Example 9*

To composition I, there were added 3.75 parts of dicyandiamide, 0.25 part of zinc laurate, and 0.075 part of barium caprylate. Evidence of brown staining was observed after 74 hours of exposure.

*Example 10*

Example 9 was repeated with further addition of 0.3 part of potassium sulfate. In this case, evidence of brown staining was observed only after 140 hours of exposure.

I claim:

1. A plastic composition suitable for floor tiles comprising (1) a vinyl chloride resin consisting of at least 60 percent by weight of vinyl chloride polymer, the balance being an ethylenically unsaturated organic compound copolymerizable with vinyl chloride, (2) asbestos, and (3) a stabilizer comprising
    (a) a compound of the formula

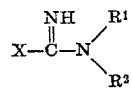

wherein X is a member of the group consisting of

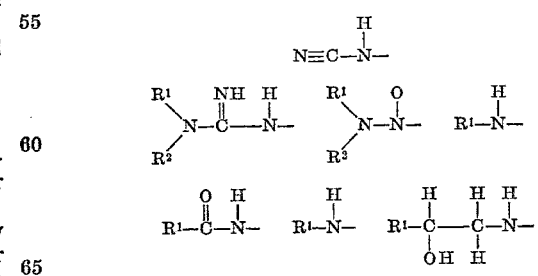

and $R^1$ and $R^2$ in all said formulas are members of the group consisting of hydrogen, alkyl, and aryl, said stabilizer being present in an amount of 1 to 10 percent by weight of the resin,
    (b) at least one salt of a member of the group consisting of alkaline earth metals, zinc, cadmium, lead, and tin, with an organic acid selected from the group consisting of fatty acids having 6 to 18 carbon atoms, benzoic acids, and substituted benzoic acids, in an amount of about 0.05 to 5 percent by weight of the resin and (c) an alkali metal sulfate in an amount of 0.5 to 5 percent by weight of the resin.

2. A plastic composition as claimed in claim 1 wherein said alkali metal sulfate is potassium sulfate.

3. A vinyl floor tile containing the plastic composition of claim 1.

4. A plastic composition as claimed in claim 1 containing about 10 to 50 percent of asbestos and about 5 to 20 percent of said resin, the balance being essentially plasticizers and fillers.

5. A vinyl floor tile consisting essentially of the plastic composition of claim 4.

References Cited by the Examiner

UNITED STATES PATENTS

| | | | |
|---|---|---|---|
| 2,365,400 | 12/1944 | Fikentscher | 260—88 |
| 2,557,474 | 6/1951 | Sanderson | 260—45.7 |
| 2,949,437 | 8/1960 | Hobson | 260—45.75 |
| 3,084,135 | 4/1963 | Scullin | 260—41 |

OTHER REFERENCES

Smith: "Stabilizers for Vinyl Polymers," Part 4, British Plastics, August 1954, pp. 307–311.

MORRIS LIEBMAN, *Primary Examiner.*

K. B. CLARKE, A. HOLTZ, H. S. KAPLAN,
*Assistant Examiners.*